Feb. 26, 1929.

W. E. HOLLAND 1,703,735

DEMOUNTABLE BATTERY

Filed March 25, 1922 5 Sheets-Sheet 1

Inventor—
Walter E. Holland,
by his Attorneys
Howson & Howson

Feb. 26, 1929.

W. E. HOLLAND 1,703,735

DEMOUNTABLE BATTERY

Filed March 25, 1922   5 Sheets-Sheet 2

Inventor-
Walter E. Holland
by his Attorneys-
Howson & Howson

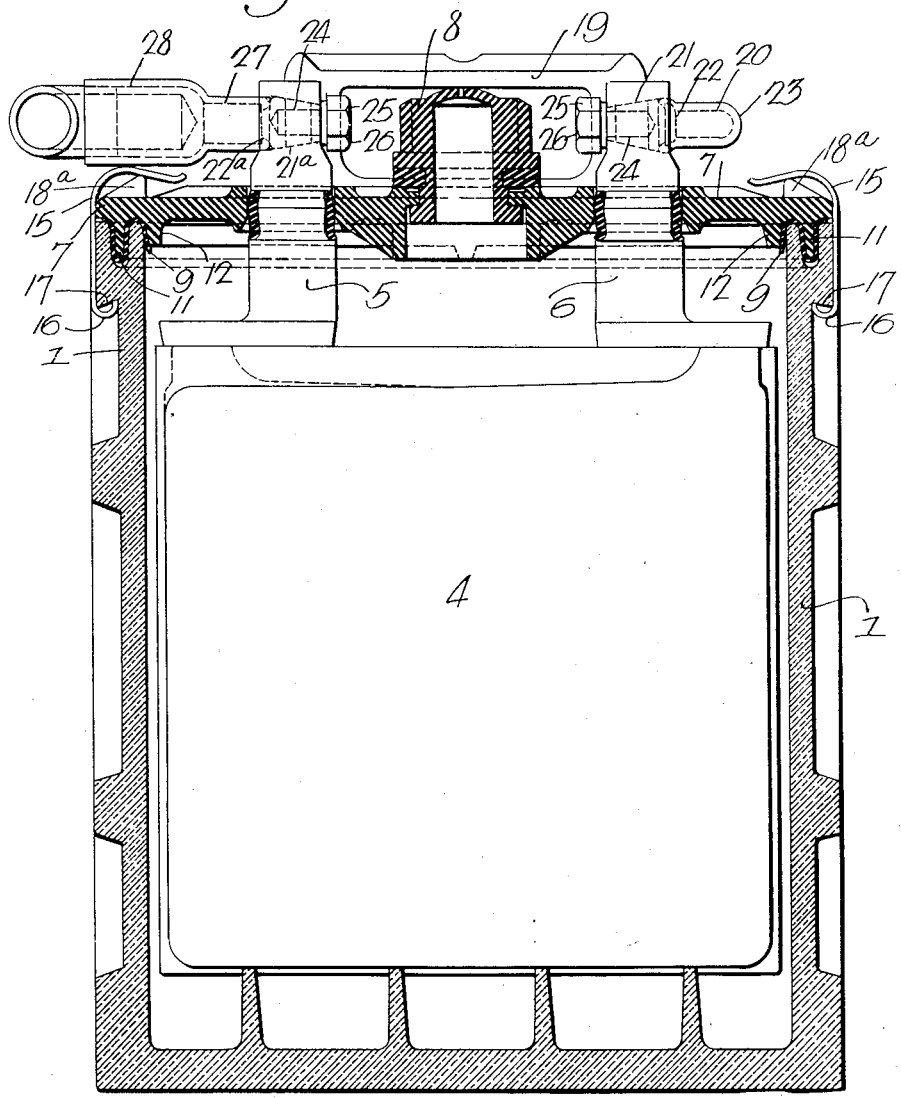

Feb. 26, 1929.
W. E. HOLLAND
1,703,735
DEMOUNTABLE BATTERY
Filed March 25, 1922      5 Sheets-Sheet 4
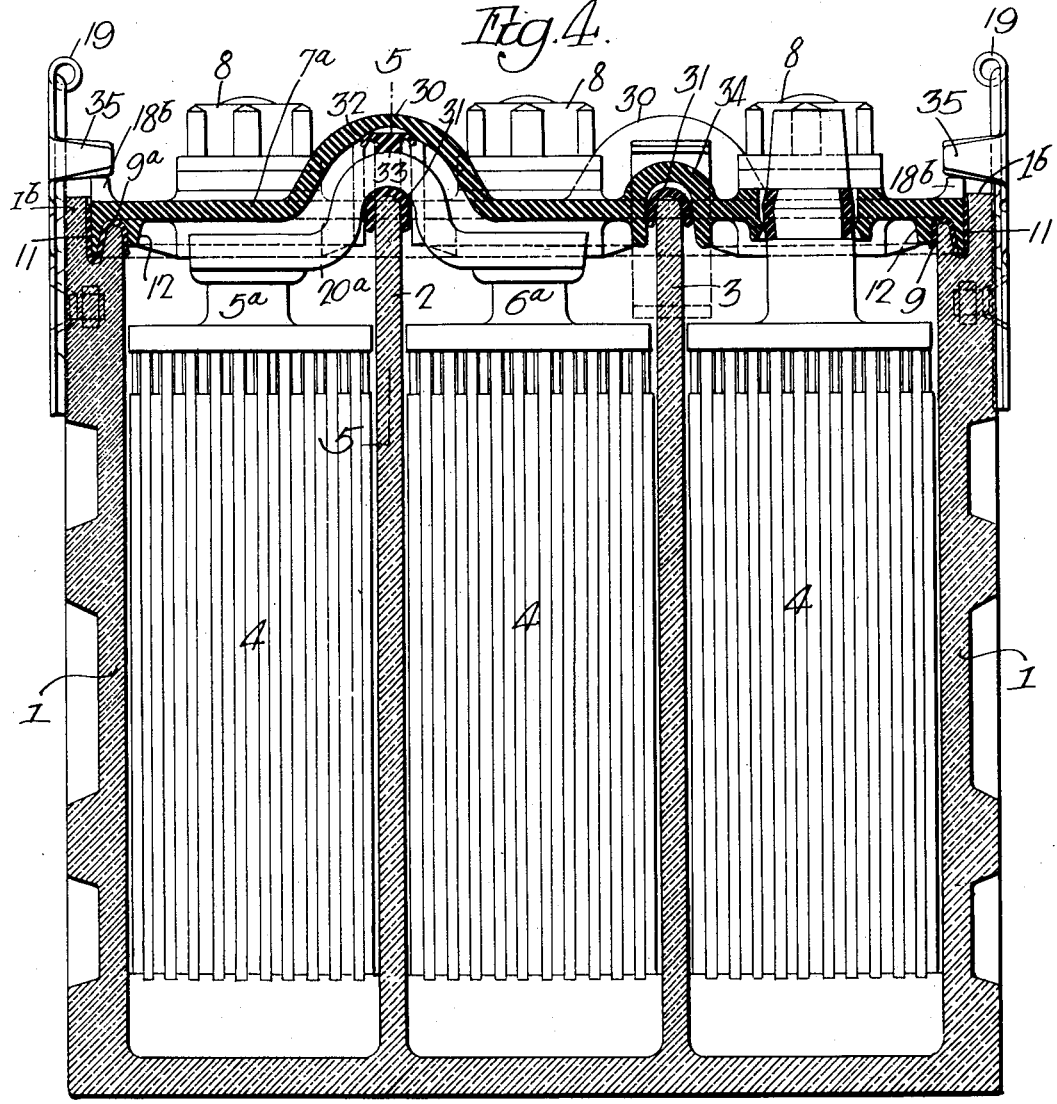
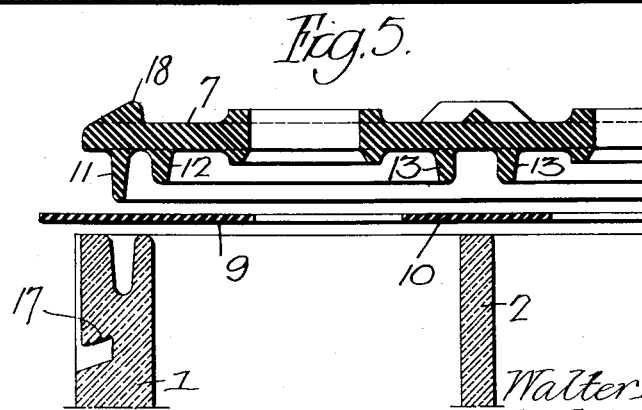
Inventor.
Walter E. Holland.
by his Attorneys.
Howson & Howson

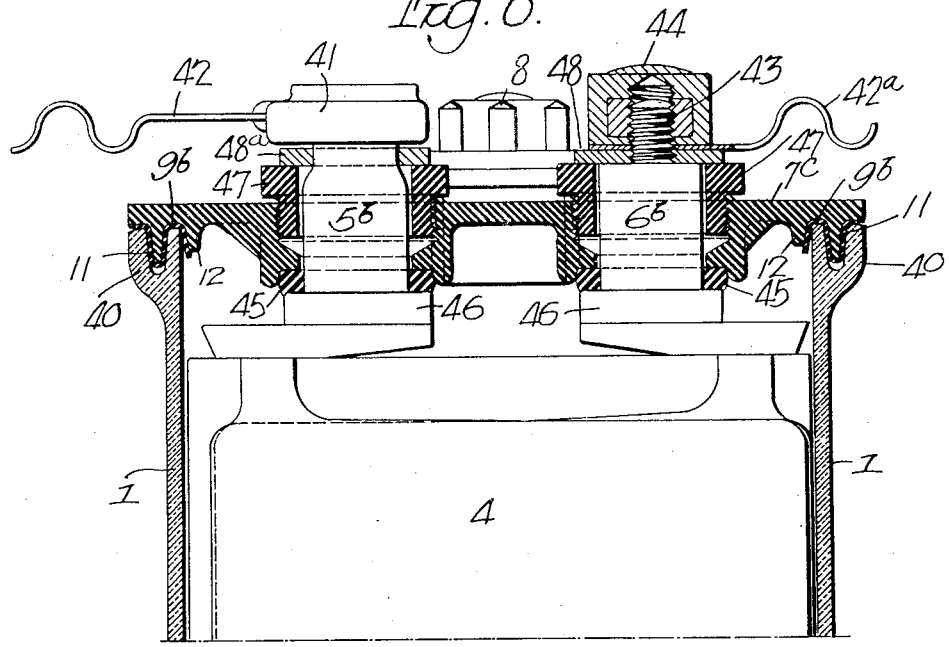

Patented Feb. 26, 1929.

1,703,735

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

DEMOUNTABLE BATTERY.

Application filed March 25, 1922. Serial No. 546,596.

One object of this invention is to provide a liquid-tight battery of such construction as to permit of its being assembled, taken apart and reassembled without the use of the customary asphaltum or similar sealing compound which requires the application of heat for making or breaking the seal; and the invention further contemplates novel mechanical-electrical connections at the cell posts of a battery in place of the usual burned or welded connections, making possible and easy the mounting and dismounting of said connections and the removal of the cover and individual cell elements without necessitating the operation of welding or lead-burning.

Another object of the invention is to provide a mechanical form of liquid-tight seal between a battery container and the cover thereof of such a nature as will permit of considerable variation in the fit and engagement of these parts without impairing the desired functioning of said seal:—the construction and arrangement being such that the sealing qualities of the joint shall not be injuriously affected by the presence of moisture or of electrolyte on the coacting surfaces before they are brought together, or by such limited deformation of the container or cover as is permitted by the construction.

These objects and other advantageous ends I attain as hereinafter set forth, reference being had to the accompanying drawings, in which, Fig. 1 is a plan of a battery constructed in accordance with my invention;

Figs. 2 and 3 are elevations partly in section, taken respectively on the lines 2—2 and 3—3, Fig. 1;

Fig. 4 is a side elevation partly in section, illustrating a modified form of my invention in which the intercell connections are positioned beneath the cover through which the two terminal posts alone extend;

Fig. 5 is a detached fragmentary vertical section illustrating the relative positions of a cover, gasket and container with its partition before these parts are assembled, and Fig. 6 is a fragmentary vertical section showing my invention as applied to a single battery cell of a type different from those shown in the Figs. 1 and 4.

Figure 1:
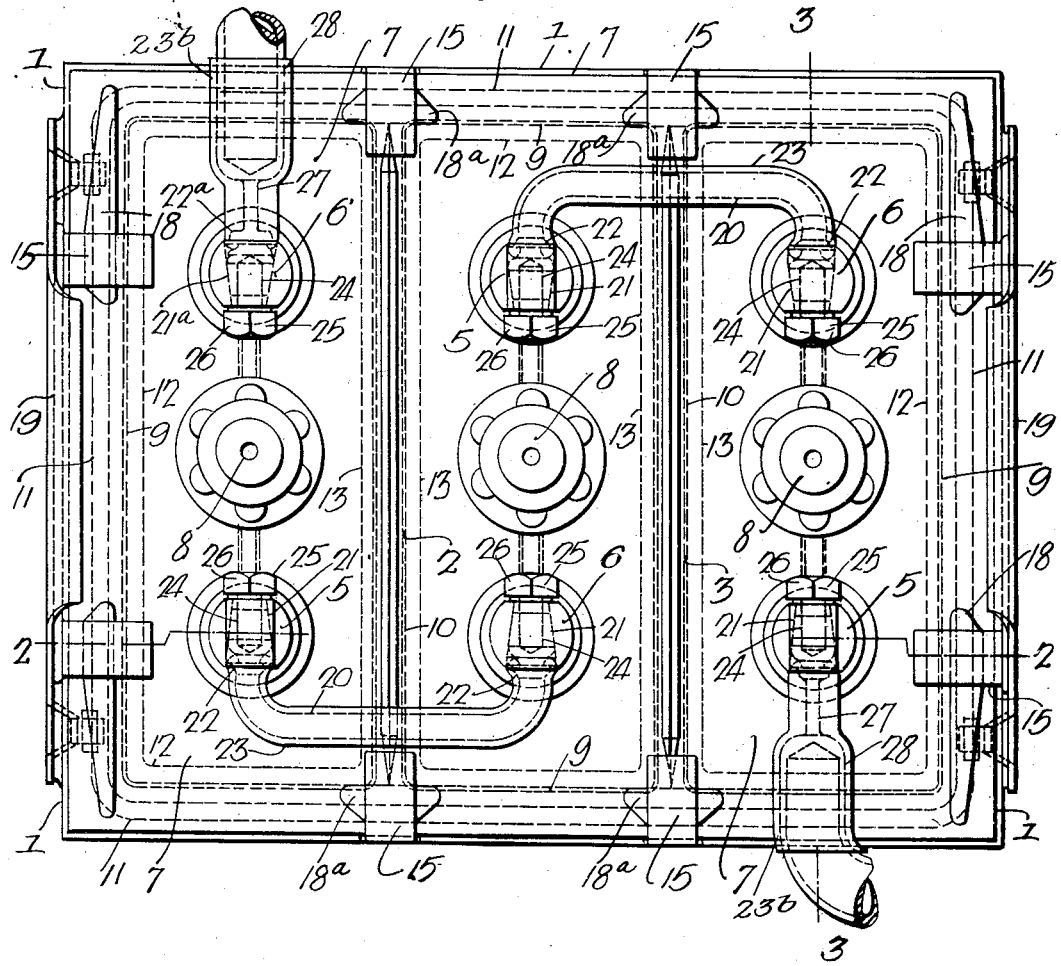
Figure 2:
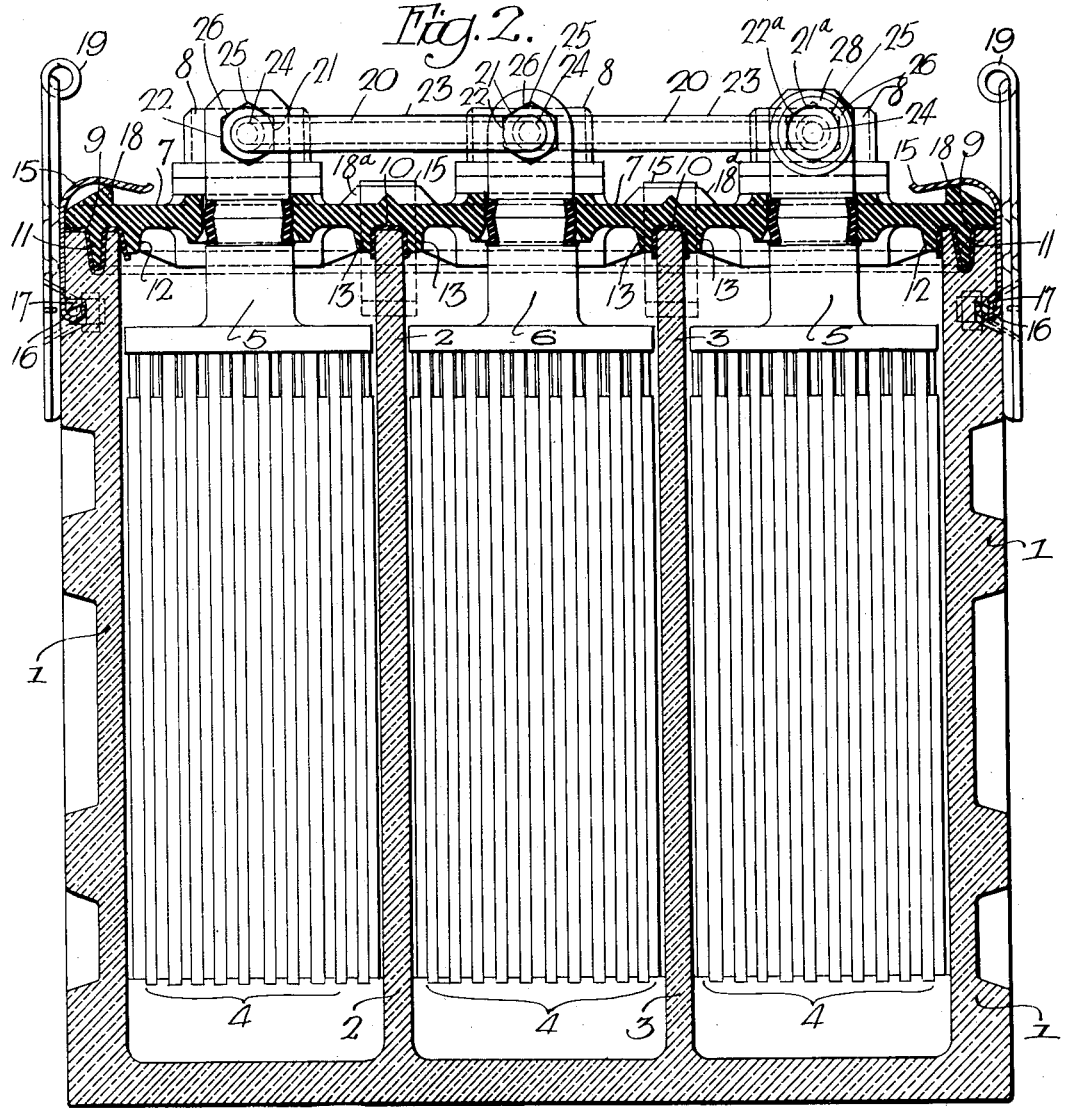

In Figs. 1 to 3 of the above drawings, 1 represents a battery container in the form of a jar having in the present instance two integral, vertically extending partitions 2 and 3 dividing it into three compartments or cells, and in each of these latter is supported in any suitable manner one of the plate-and-separator elements 4 of a storage battery. Each of these elements has its upwardly projecting terminal posts 5 and 6 extended through suitably placed openings in a cover 7 designed to close all of the cells of the container.

For making conveniently-assembled, yet separable liquid-tight seals between the cover and the terminal posts 5 and 6, I preferably employ one or another modification of the construction described and claimed in Patent #1,371,894, dated March 15, 1921. In addition to the openings for said terminal posts, said cover has a filling opening into each of the cells of the container, normally closed by a removable vented cap 8. In order to provide a demountable yet liquid-tight seal between the cover and the top edges of the container walls and partitions, I provide in the preferred form of my invention, a gasket 9, preferably of soft rubber or equivalent material, having the general outline of the cover and including transverse portions 10, in addition to its peripheral or edge portions, designed to lie between said cover and the top edges of the partitions 2 and 3. If desired, this gasket may be lubricated for use, as with glycerine or other non-injurious solution.

For the purpose of most effectively cooperating with the gasket 9, I preferably form one of the two elements, comprised by the cover and the container, with a continuous projecting rib 11 and form in the other of said elements a similarly-shaped recess for the reception of said rib, so that when the cover, the container and the gasket have been brought to the positions shown in Fig. 5 and then forced into engagement, there is formed a labyrinthine passage, into which the gasket 9 is forcibly compressed so that passage of liquid therethrough is effectually prevented. To further increase the efficiency of this seal, I may provide a second rib 12, in this instance on the cover, so spaced in relation to the rib 11 as to press the inner edge of the gasket 9 against the inner surface of the wall of the container 1. This rib 12 follows the inner face of the end and side walls of the container and also runs along the partitions 2 and 3 as shown at 13, thus forming an endless rib inside the bounding walls of each compartment of the container. The ribs 13 form recesses for the reception of the upper edges of said partitions and engage the transverse portions 10 of the gasket, causing these to assume an inverted channel form. The dimentions and arrangement of the parts are such that when the cover occupies the position shown in Figs. 2 and 3, the gasket cooperates with it to form liquid-tight joints along the tops of the partitions as well as along the top edges of the outer container walls.

For firmly yet removably holding the cover and gasket in the positions shown in Figs. 1 and 2, in which they cooperate to form a liquid-tight seal with the top edges of the container walls and partitions, I provide some separable form of fastening or locking device. In the present instance, this device consists of a series of more or less springy metal clips 15 of sheet or strip metal, each having one end turned over in the form of a hook 16 to engage and hold to a suitable shoulder 17 formed on the side of the container adjacent its top edge. In the present instance there are two of these shoulders with two clips for each of the four outer walls of the container, and each of said clips has its upper end bent over to an angle of somewhat less than 90° with its body so as to be capable of snapping into engagement with a suitably formed boss 18 or 18ª, on the cover. Said cover bosses preferably slope inwardly and upwardly from the container edges and the tip of the cover-engaging end of each clip is preferably so rounded or smoothed that it will not tend to dig into the sloping surface of the boss when pressed against it.

With this arrangement of parts, after the cover has been forced into place, the hooked end 16 of each of the clips 15 is placed in engagement with one of the shoulders 17 of the container, and the cover-engaging end of said clip is then forcibly moved toward the adjacent boss 18 or 18ª, until it snaps over the top of said boss when its further movement is stopped by reason of the engagement of its body with the side of the container or the edge of the cover. Under these conditions the cover is forcibly held under spring tension in its sealing position so that it tends to become better seated with vibration and use. Owing to the formation of their upper ends, the clips tend to remain in engagement with the cover and to resist such an outward swinging as would free them from their coacting bosses 18 or 18ª, while at the same time, when desired, the clips may be forced outward with comparative ease and quickly removed.

In that form of the invention shown in Figs. 1 to 3 the container has mounted on it two oppositely-placed handles 19 which may have the construction described and claimed in my application for U. S. Patent #519,169, filed December 1, 1921, and particularly designed to avoid retention of electrolyte or other liquid between themselves and the adjacent walls of the container, while reinforcing the latter.

If desired I may so construct the battery that the intercell connectors shall be enclosed within the container by the cover, which will then be so constructed and assembled with the gasket and container as to make a liquid-tight seal with the outer walls and partitions of the latter, as shown in Fig. 4. While, as in the case of Figs. 1 to 3 inclusive, the top edge of the container is formed with a continuous and preferably downwardly tapered recess or groove for the reception of a correspondingly formed continuous rib 11 on the cover 7ª, the outer portions of said container edge may be extended upwardly as indicated at 1ᵇ, to or somewhat above the level of the top of said cover, which as before has an inner or supplementary continuous rib 12 coacting with the inner face of the container wall to compress or make a sealing connection with the inner edge of the gasket 9ª.

As shown in Fig. 4, in order to hold the cover in its sealing position on the container, I may provide, in addition to or in place of the spring clips shown in Figs. 1 to 3 inclusive, inwardly projecting lugs 35 on the handles 19, positioned so that their bottom and upwardly inclined edges will coact with lugs 18ᵇ on the cover when the handles are bolted in place. As indicated in Fig. 4, these lugs 35 on the handles, with their coacting lugs 18ᵇ on the cover, suffice to hold the ends of the latter in place, while the clips 15 engaging the side walls of the container as above described, properly hold down the side portions of said cover.

As shown in Fig. 6, I may apply certain features of my invention to the provision of a demountable seal for a single cell container, and, in this particular case, laterally thicken or enlarge the top edge of the walls of said container as indicated at 40, forming in it a downwardly tapering continuous groove or recess. As in the other forms of my invention, the cover is formed with a continuous downwardly projecting rib or tongue designed to fit into this groove and also includes a second supplementary rib 12 parallel therewith, designed to coact with the gasket 9ᵇ which when the parts are assembled, is compressed within the labyrinthine passage between said cover and the top edge of the container.

From the foregoing description it will be appreciated that the parts of any of the above described battery structures may be both assembled and separated with the utmost ease and convenience without the use of special tools and for the most part without requiring lead-burning of the post connections. The structures are not only relatively simple and substantial, but are of such a nature as to withstand rough usage without failure. At the same time, reliable liquid-tight seals are formed between the cover and the container and cell terminal posts without the use of the usual sealing compound. The intercell and other connectors employed are of such a nature as to maintain good contact with the parts which they engage, while being effectually protected from the corrosive action of the electrolyte, and even though the spring clips 15 be made of corrodible metal they may be easily and quickly replaced.

A valuable feature of the tongue-and-groove construction of the cover and container is the resultant strengthening and reinforcing of the upper portions of the container walls whereby these are effectually prevented from bulging. Moreover the construction is such as to provide a liquid-tight joint between the several parts in spite of slight variations in their dimensions. As previously indicated, vaseline, asphaltum oil, or other viscous liquid or semi-liquid may be employed in place of soft rubber in forming the seal desired,— the requirement being that the tongued and grooved elements when brought together, shall force the above material into a thin film tending to remain in position by reason of its surface tension and the force of adhesion.

I claim:

1. The combination of a battery cell container having a tapered groove along a top edge thereof; a cover having a tapered rib formed to fit into said groove and a second rib adjacent the inner faces of the container walls; with packing maintained in corrugated form by said ribs and groove between the cover and the container.

2. The combination of a container having an open top formed with a continuous tapered groove in its free edge; a cover having a plurality of ribs formed to coact with the grooved edge of said container, one of said ribs being tapered and adapted to project into said groove; and yielding packing maintained under pressure between the grooved edge of the container and the ribbed portion of the cover.

WALTER E. HOLLAND.